United States Patent [19]
Feichtinger

[11] Patent Number: 6,002,126
[45] Date of Patent: Dec. 14, 1999

[54] METHOD AND STRUCTURE FOR ASSEMBLING A SCANNING UNIT IN A POSITIONING MEASURING INSTRUMENT

[75] Inventor: Kurt Feichtinger, Palling, Germany

[73] Assignee: Johannes Heidenhain GmbH, Traunreut, Germany

[21] Appl. No.: 08/964,294

[22] Filed: Nov. 4, 1997

[30] Foreign Application Priority Data

Nov. 6, 1996 [DE] Germany ................... 196 45 605

[51] Int. Cl.⁶ ....................................... G01D 5/34
[52] U.S. Cl. ............................... 250/231.13; 33/707
[58] Field of Search ............ 250/231.13, 231.14, 250/231.18; 33/706, 707, 708; 356/395, 396

[56] References Cited

U.S. PATENT DOCUMENTS

| 4,095,903 | 6/1978 | Feichtinger ............... 33/707 |
| 4,663,851 | 5/1987 | Feichtinger . | |
| 4,737,698 | 4/1988 | McMullin et al. . | |
| 4,794,250 | 12/1988 | Togami . | |
| 5,103,917 | 4/1992 | Moore . | |

FOREIGN PATENT DOCUMENTS

| 0280 390 | 8/1988 | European Pat. Off. . |
| 0177 711 B1 | 9/1990 | European Pat. Off. . |
| 0182 085 | 4/1992 | European Pat. Off. . |
| 37 40 744 | 6/1988 | Germany . |

*Primary Examiner*—Edward P. Westin
*Assistant Examiner*—Kevin Pyo
*Attorney, Agent, or Firm*—Brinks Hofer Gilson & Lione

[57] ABSTRACT

The spacing distance D between a scale and a scanner element of a scanner unit is adjusted simply through the use of a positioning element which is part of the scanning unit. The scanner unit has a mounting element on which the scanner element is supported. The scanner element is displaceable perpendicularly to a surface of the scale from a first reference position to a second reference position. A screw is used to actuate for the displacement and the reference positions are predetermined by stop faces of the screw and stop faces of the mounting element.

18 Claims, 6 Drawing Sheets

METHOD AND STRUCTURE FOR ASSEMBLING A SCANNING UNIT IN A POSITIONING MEASURING INSTRUMENT

BACKGROUND OF THE INVENTION

The invention relates to a method and structure for assembling a scanning unit in a position measuring instrument.

In position measuring instruments a scale is scanned by a scanning unit. The scanning unit generates position-dependent electrical scanning signals which are delivered to tracking electronics, such as a counter or a numerical controller to determine the amount of movement of the scale with reference to the scanning unit. The quality of the scanning signals depends on the spacing between the scanning unit and the scale which makes it necessary to mount the scanning unit at a precisely defined spacing relative to the scale.

U.S. Pat. No. 4,663,851 describes a position measuring instrument including a graduation unit and a scanning unit. The graduation unit has a centering flange, a scale and a graduation located on the scale. The scanning unit has a scanning component which includes a scanning graduation and a stop. During assembly, the scanning unit is positioned radially with respect to the scale by positioning the stop against the centering flange. The scanning component may then be moved along a guide towards the scale. As the scanning component is moved towards the scale the stop no longer makes contact with the centering flange. A spacing foil, removably sandwiched between the scale and the scanning graduation, is used to position the scanning graduation at a predetermined distance from the scale. A locking means is then used to prevent further movement of the scanning component along the guide. A disadvantage with such a position measuring instrument is the necessity of using a separate foil as a spacer.

U.S. Pat. No. 4,794,250 discloses a position measuring instrument and, more particularly, a rotary angle encoder that has no bearing of its own. Such rotary angle encoders are known as built-in rotary angle encoders. The relative position of the scanning unit and a scale is not defined until the scanning unit and scale are mounted on the objects to be measured. To simplify the mounting, a fixation element is integrated with the rotary angle encoder and is in contact with a hub of the scale and defines the position of the scale during the mounting. Once the scale has been mounted on one of the objects and the scanning unit has been mounted on the other object, the fixation element is removed from the hub. A disadvantage with such a position measuring instrument is the necessity of using a separate element, the fixation element, in order to position the scanning unit. Another disadvantage with this system is that the scale cannot be fastened independently of the housing and the fixation element on the shaft. At assembly the scale already has a clear association with the fixation element and the scanning unit.

It is desirable to provide a position measuring instrument that is simple in design and with which the requisite spacing between the scanning unit and the scale can be adjusted easily. It is also desirable to provide a position measuring instrument in which the scale can be fastened independently of the further components of the measuring device thereby simplifying assembly of the instrument. It is also desirable to provide a method that assures the simple and correct mounting of a scanning unit in a position measuring instrument.

An advantage of the invention is that the correct spacing required between the scanning unit and scale is defined by the components of the scanning unit itself without the need for additional components.

SUMMARY OF THE INVENTION

According to a first aspect of the invention, there is provided a position measuring instrument for measuring the relative position of two objects movable relative to one another in which a scale is scanned by a scanner element of a scanning unit wherein the scale is secured to the first object and the scanning unit is secured to the second object by a mounting element. The instrument includes a positioning element integrated into the scanning unit and with it the scanner element is displaceable relative to the mounting element from a first reference position to a second reference position wherein the reference positions are predetermined by the cooperation of elements integrated in the scanner unit.

According to a second aspect of the invention, there is provided a method for mounting a scanner unit of a position measuring instrument, in which a scale is secured to a first object and the scanner unit and the scanner unit is secured by means of the following method steps to a second object for scanning the scale. The method includes the steps of:

a) fixing a scanner element in a first reference position on a mounting element by a positioning element;

b) moving the scanner unit, comprising the scanner element, the mounting element and the positioning element in the direction of the scale until an element of the scanner unit is in contact with the scale;

c) fixing the mounting element to a second object;

d) moving the scanner element on the mounting element by the positioning element to a second reference position to provide a scanning spacing between the scale and the scanner element.

According to a third aspect of the invention there is provided a scanning unit of a position measuring device. The scanning unit includes a scanner element, a mounting element, and a positioning element coupling the scanner element to the mounting element, wherein the positioning element positions the scanner element at a first reference position with respect to the mounting element in a first state and positions the scanner element at a second reference position with respect to the mounting element in a second state.

DETAILED DESCRIPTION OF THE PRESENTLY PREFERRED EMBODIMENTS

Figure 1:
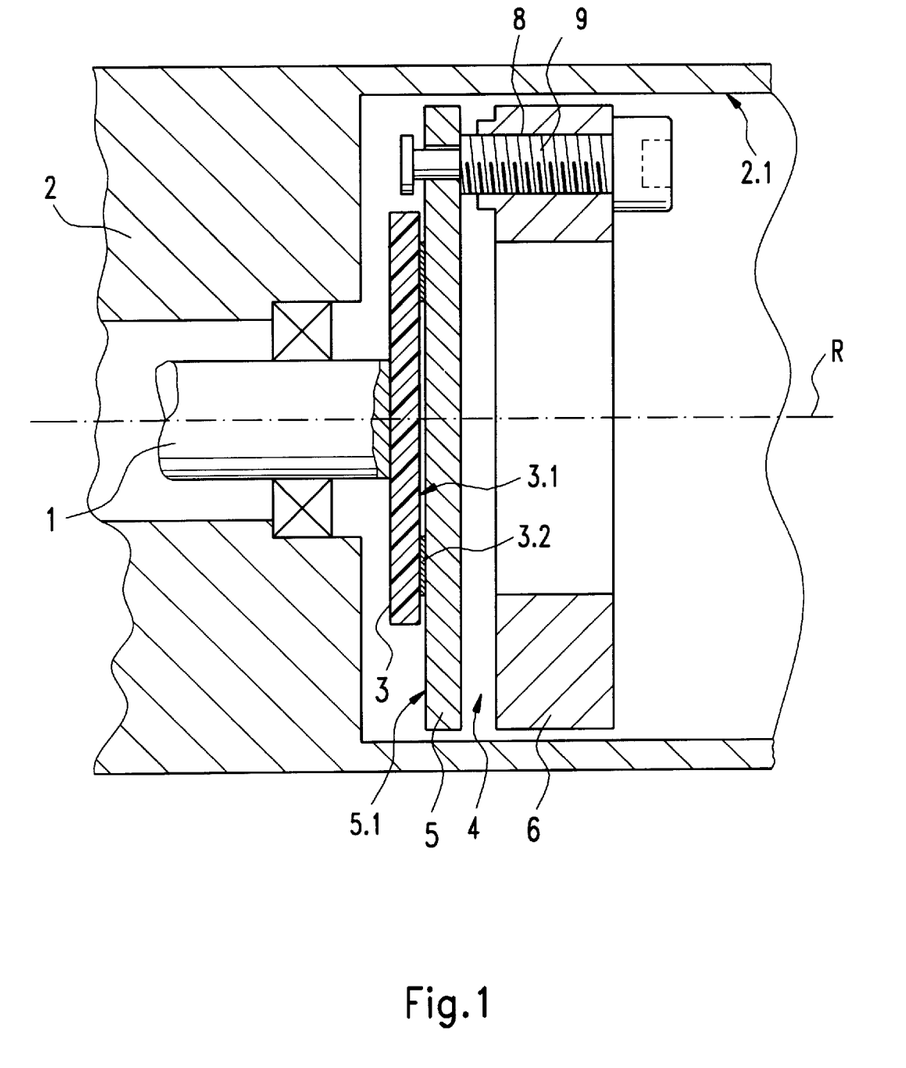
FIG. 1 is a cross-sectional view of a portion of a position measuring instrument in its mounting position according to a preferred embodiment of the present invention.

FIG. 1 is a cross-sectional view of a portion of a position measuring instrument shown in its mounting position according to a preferred embodiment of the present invention. The position measuring instrument is secured to a drive device. In a preferred embodiment the drive device is a motor having a shaft 1 and a stator 2. It is desirable to use the position measuring instrument to measure the relative movement between the stator 2 and shaft 1. For that purpose a scale 3 is coupled to the shaft 1 and a scanning unit 4 is coupled to the stator 2. In a preferred embodiment the position measuring instrument is an angular encoder with the scale 3 in the form of a disk. The scale 3 can be secured to the shaft 1 by screws, adhesive bonding, press-fitting or clamping, for example. On one surface of the scale 3, i.e., surface 3.1, the scale 3 has a graduation 3.2 or a code.

Figure 2:
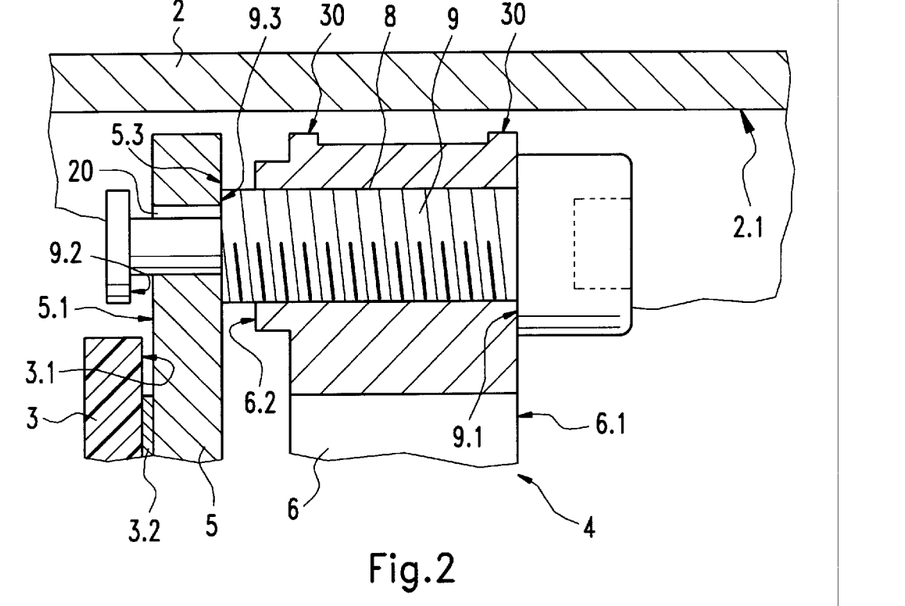
FIG. 2 is an enlarged view of a portion of the instrument shown in FIG. 1.

The scanning unit 4 includes a scanner element 5 mounted on a mounting element 6. In operation the graduation 3.2 is scanned by the scanning unit 4 in a manner well known to those of ordinary skill in the art. The scanner element 5 is displaceable with respect to the mounting element 6 along axis R, i.e., at right angles to the surface 3.1. More particularly, in a preferred embodiment a guide allows the displacement of the scanner element 5. In a preferred embodiment the guide is formed by a threaded bore 8 extending through the mounting element 6 and a screw 9 rotatably supported in the threaded bore 8. The scanner element 5 is secured to one end of the screw 9 as shown. The scanner element 5 is displaceable between two reference positions, a first reference position closest to the mounting element 6 (shown in FIGS. 3 and 4) and a second reference position furthest away from the mounting element 6 (shown in FIGS. 1 and 2). As will be described in greater detail hereinafter, the scanner element 5 is displaceable by rotating screw 9. Screw 9 thus acts as a positioning element. The first reference position shown in FIGS. 1 and 2 and is referred to as a mounting position. With reference to FIG. 2 which is an enlarged view of a portion of the instrument shown in FIG. 1, a first stop face 9.1 of the screw 9 cooperates with a first stop face 6.1 of the mounting element 6. A second stop face 9.3 of the screw likewise cooperates with a second stop face 5.3 of the scanner element 5.

In this first reference or mounting position, the scanning unit 4 is coupled to the stator 2 of the drive device in a rotationally rigid manner. Hereto the scanner unit 4 is guided axially into the tube 2.1 of the stator 2 toward the surface 3.1 of scale 3, until the scanner element 5 makes contact with the scale 3 as shown. In this state, the scanning unit 4 is fixed on the stator 2 by the mounting element 6.

Figure 3:
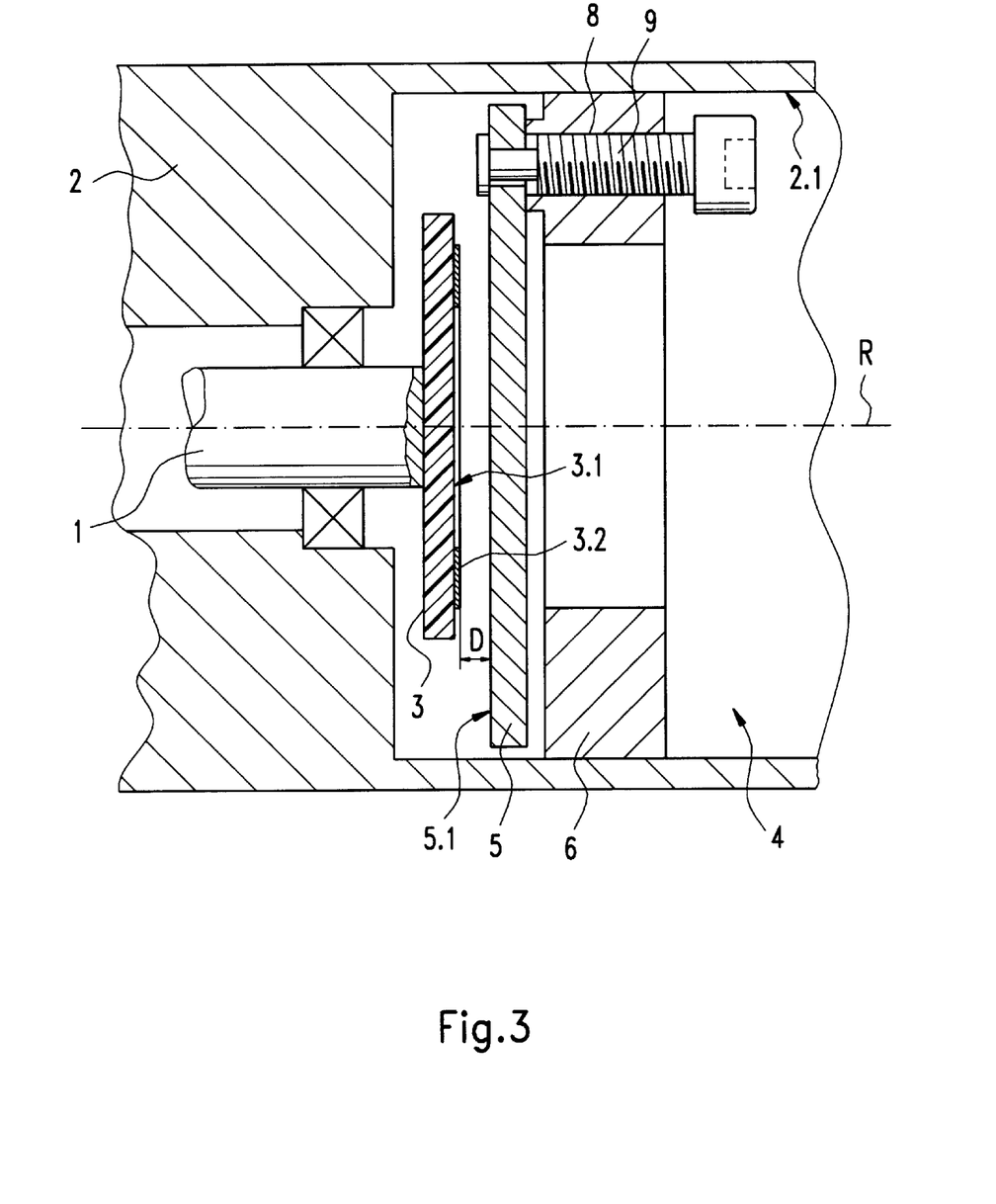
FIG. 3 is a cross-sectional view of a portion of the position measuring instrument shown in FIG. 1 in its operating position according to a preferred embodiment of the present invention.
Figure 4:
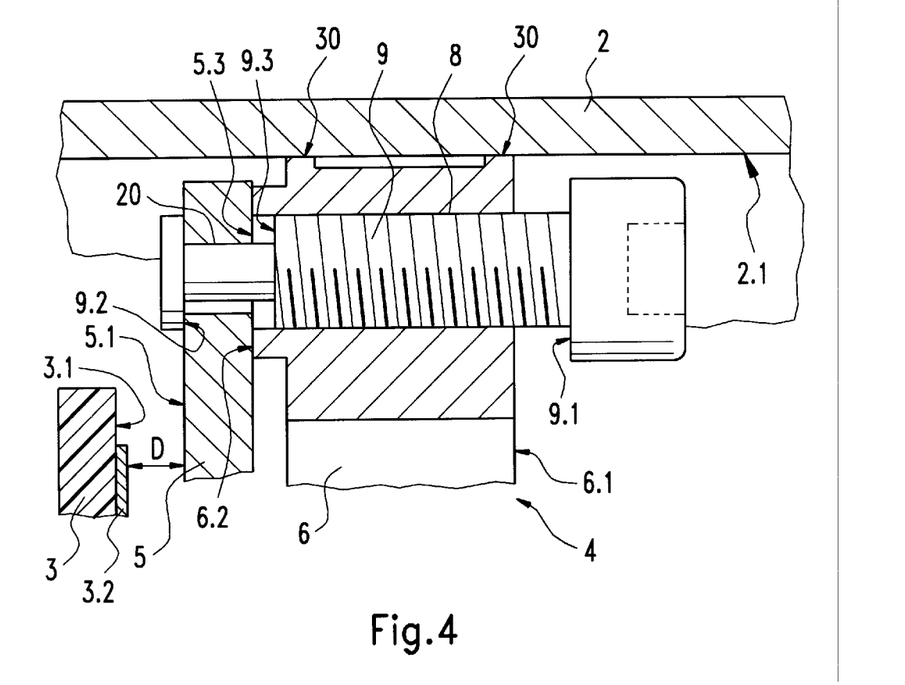
FIG. 4 is an enlarged view of a portion of the instrument shown in FIG. 3.

To adjust the requisite spacing between the scanning element 5 and the scale 3 the screw 9 is rotated until a second stop face 6.2 of the mounting element 6 cooperates with a second stop face 9.2 of the screw 9. This second reference position, also known as an operating position, is shown in FIGS. 3 and 4. In this example, this second stop face 6.2 of the mounting element 6 cooperates with the second stop face 9.2 of the screw 9 through the interposition of the disk 5. The scanning spacing D between the surface 3.1 of the scale and the scanner element 5 is preferably about 0.5 to about 1 mm.

Because the positioning element, screw 9, is part of the scanning unit 4 itself, the scanner element 5 can be moved back and forth from the first reference position to the second reference position relative to the mounting element 6 where the reference positions are predetermined by parts of the scanning unit 4 itself. The spacing distance D is determined by the spacing between the two reference positions. The displacement from the first to the second reference position takes place at right angles to surface 3.1, i.e., along the rotational axis R. The stop faces 6.1. 6.2, 9.1, 9.2 extend at right angles to the rotational axis R.

In a preferred embodiment the angle measuring instrument is preferably an inductively operating device of the kind described in U.S. Pat. No. 4,737,698. The scale 3 includes electrically nonconductive material and an incremental division of spaced-apart electrically conductive regions 3.2 applied to surface 3.1. The scanner element 5 is preferably a board onto whose surface 5.1 excited and sensor coils are applied by thinfilm technology. The board 5 is preferably embodied in disk form. To enable the displacement of the relatively large, unstable board 5 in a defined way relative to the mounting element 6 three screws 9, offset by 120° from one another, may be provided as positioning elements, as can be seen from FIG. 5. Alternatively the scale can be scanned photoelectrically, magnetically or capacitively, for example by providing an appropriate graduation and scanning unit.

In FIGS. 2 and 4, it is schematically shown how the screw 9 is moved in an oblong slot 20 of the scanner element 5. In the adjustment of the scanning spacing, an axial displacement of the screw 9 in the oblong slot 20 takes place and the mounting element radially widens to eventually engage the stator 2 wall at protrusions 30 (see FIG. 4). The mounting element 6 has protrusions 30, with which it is braced on the tube 2.1 during the radial clamping. Upon the radial widening of the mounting element 6, the screws 9 move radially outward, and therefore the longitudinal axis of the oblong slots 20 extend radially outward. The diameter of the oblong slot 20 at right angles to its longitudinal axis corresponds precisely to the diameter of the engaging screw 9. By providing a plurality of oblong slots - for example three of them offset by 120°—it is assured that the position of the scanner element will not change during the spreading of the mounting element 6.

Figure 5:
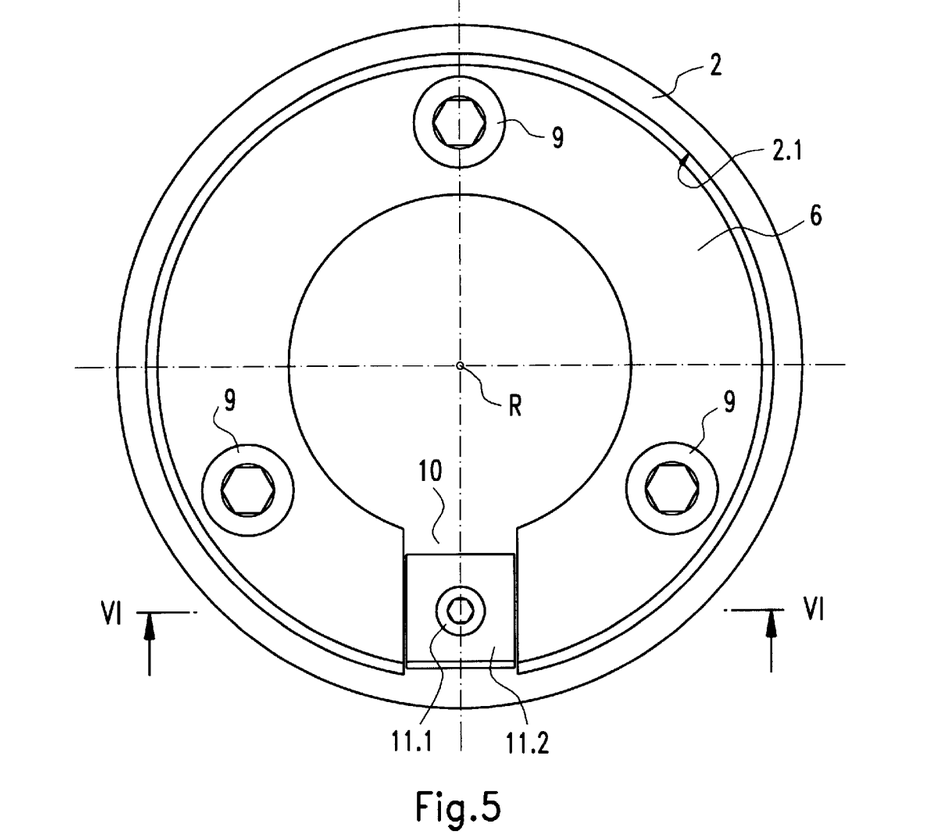
FIG. 5 is a cross-sectional view of the position measuring instrument shown in FIG. 1 taken along line V—V.
Figure 6:
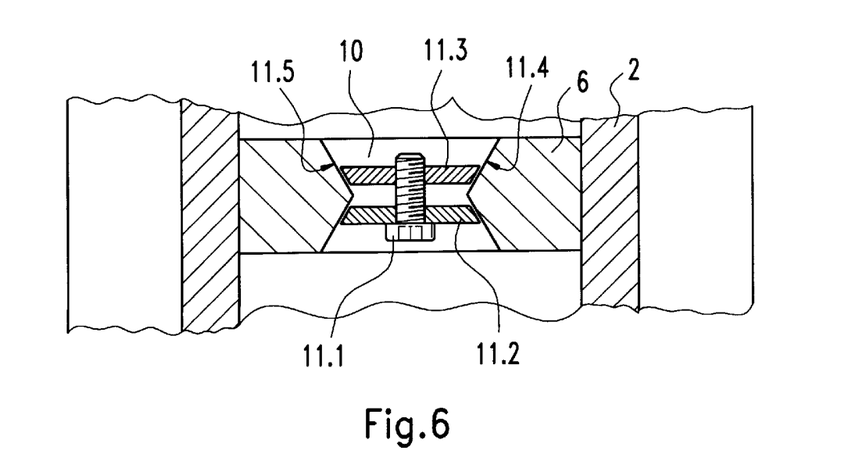
FIG. 6 is a cross-sectional view of a portion of the instrument shown in FIG. 5 taken along the line VI—VI.

The mounting element 6 of FIGS. 1–6 is an annular part whose outside diameter is slightly smaller than the inside diameter of the stator 2. As shown in FIG. 5, a radially extending slit 10 is provided in the mounting element 6. This slit 10 enables the mounting element 6 to be spread open as the screw 11.1 is rotated and thus makes it possible to increase the outer diameter of the mounting element 6 as shown in FIG. 4. To a accomplish this a spreader element 11 is provided in the slit 10. As shown in FIG. 6, the spreader element 11 includes a screw 11.1, with which two clamping elements 11.2 and 11.3, disposed one after the other in an axial direction, are movable contrary to one another. The clamping elements 11.2 and 11.3 cooperate with conical faces 11.4 and 11.5 of the mounting element 6, and are braced on these faces. By turning the screw 11.1, the two clamping elements 11.2, 11.3 are drawn toward one another, and as a result of the cooperation between the clamping elements and the conical faces, the gap 10 and thus the outside diameter of the mounting element 6 increased. The radial clamping between the stator 2 and the scanning unit 4 is especially advantageous if the scanning unit 4 is to be inserted directly into the tube 2.1 of a motor, since in this mounting no bores are needed on the motor.

In the preferred embodiments illustrated the radial clamping has been shown as clamping or widening of the ring in a direction that extends at least largely perpendicularly to the rotational axis R towards the stator 2 so that radial clamping acts upon an inner circumferential face of the stator 2. Alternatively, it is also possible to provide radial clamping on an outer surface of the stator 2. The ring 6 would have an inwardly oriented surface which must be displaced towards the interior for radial clamping to the outer surface of the stator.

In a manner not shown, the clamping element for spreading the mounting element 6 may also be a conical screw, whose cone cooperates with a corresponding bore. Radial clamping can also be accomplished by using an eccentric screw which engages the slit 10 or directly effects clamping by being axially screwed into the mounting element, and putting the eccentrically extending circumferential face of the screw head into contact with the tube 2.1 by turning the screw.

The actuating element, in this example, a screw 11.1, for initiating the radial clamping is oriented parallel to the rotational axis R and is axially accessible and actuatable which considerably simplifies mounting and assembly. Instead of screw 9 some other positioning element with which two reference positions can be established may also be provided. It is especially advantageous if the positioning element is axially accessible and actuatable.

A second preferred embodiment of an angle measuring instrument according to the invention is shown in FIGS. 7–10. Identical components are identified by the same reference numerals as in the first preferred embodiment.

Figure 7:
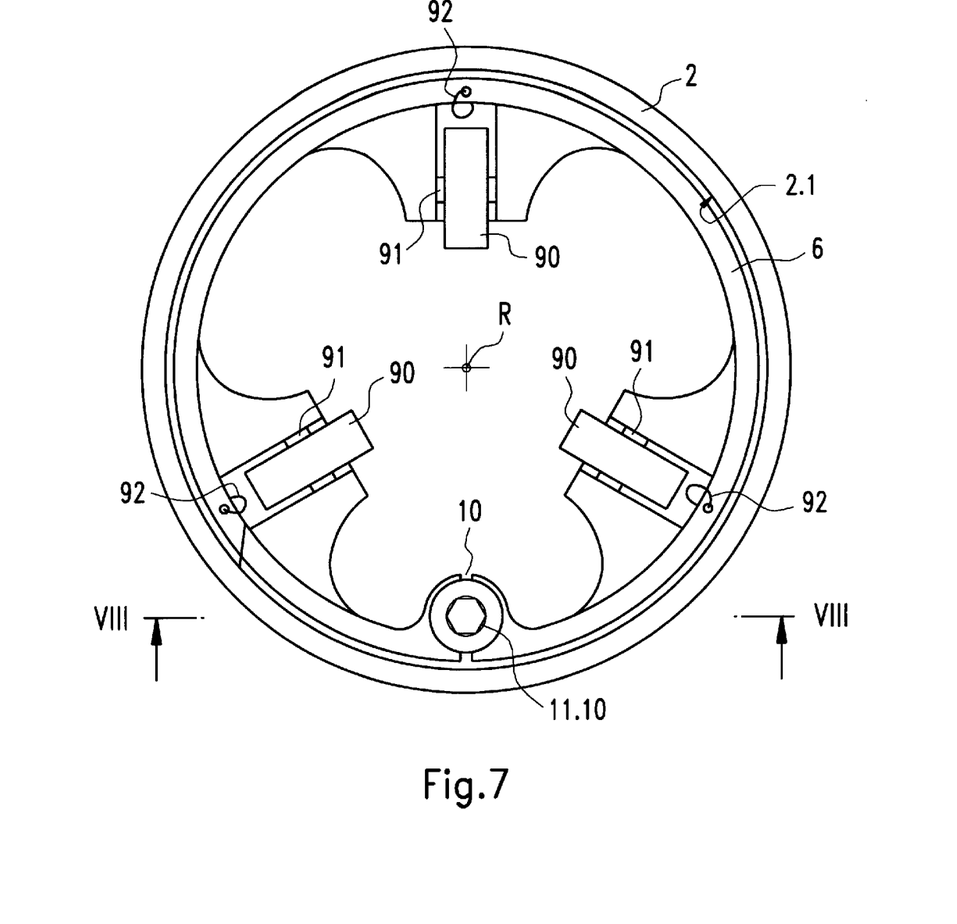
FIG. 7 is a cross-sectional view of a position measuring instrument according to another preferred embodiment of the present invention.
Figure 8:
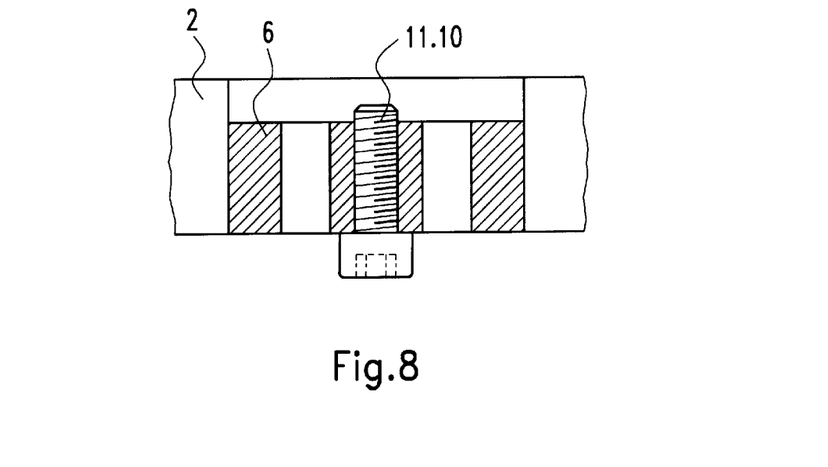
FIG. 8 is a cross-sectional view of the instrument shown in FIG. 7 taken along the line VIII—VIII.

Once again, the scale 3 has a graduation 3.2 on surface 3.1, and the scale by providing an appropriate graduation and scanning unit can be scanned photoelectrically, magnetically, capacitively, or inductively, for example. The scanner element 5 is axially displaceably supported on the mounting element 6. The displacement at the scanner element 5 is effected by actuating a lever 90 which, in this preferred embodiment, is the positioning element. As shown in FIG. 7, three levers 90 offset from one another by 120° are each pivotably supported in the mounting element 6 about a rotational axis 91.

Figure 9:
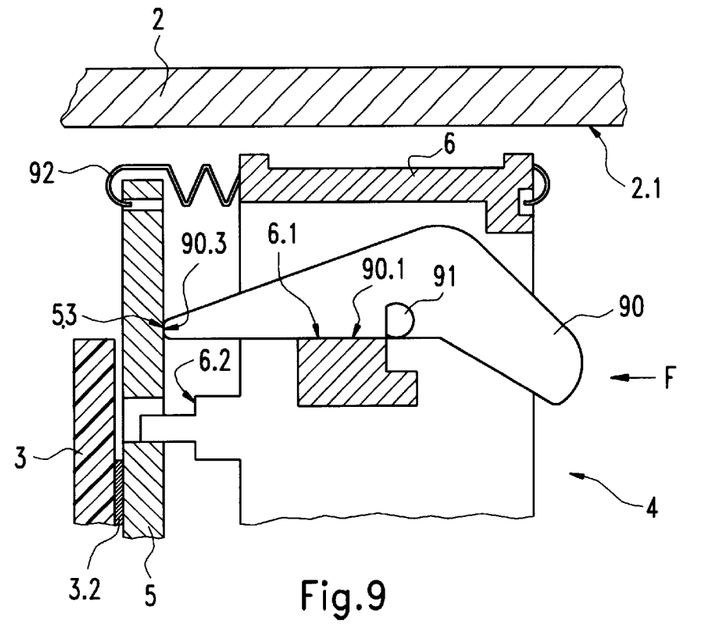
FIG. 9 is an enlarged view of the instrument shown in FIG. 7 taken of the position measuring instrument in its mounting position according to another preferred embodiment of the present invention.

The first reference position, or mounting position, is shown in FIG. 9. The lever 90 defines the first reference position for the scanner element 5. The scanner element 5 is supported axially with a stop face 5.3 on a stop face 90.3 of the lever 90. The scanner element 5 is urged against the stop face 90.3 by spring 92. The lever 90 is supported by a stop face 90.1 on a stop face 6.1 of the mounting element 6. As a result, the scanner element 5 is kept at a defined spacing from the mounting element 6.

In this state, the scanning unit 4 is guided axially towards the graduation 3.2 into the tube 2.1, until the scanner element 5 comes into contact with the scale 3. In this state, the scanning unit 4 is fixed on the stator 2 by the mounting element 6.

Figure 10:
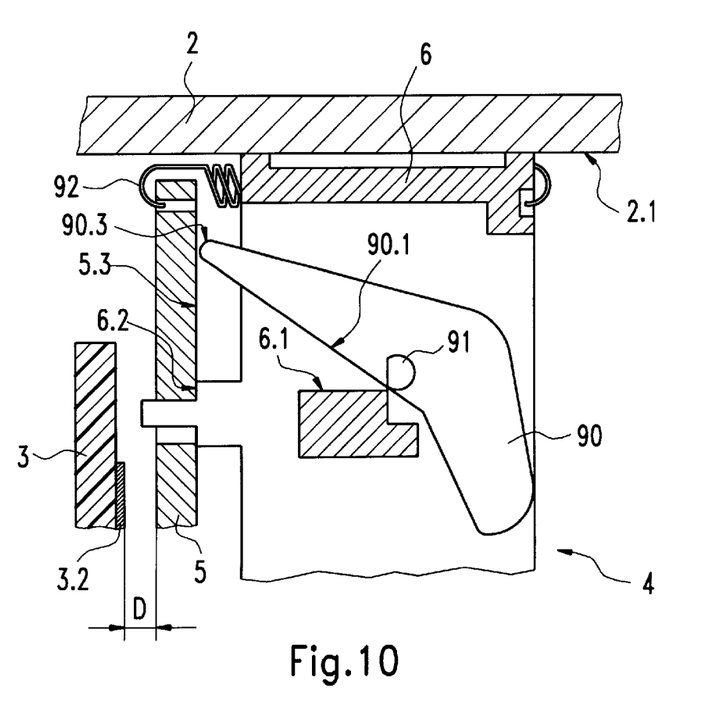
FIG. 10 is an enlarged detail of the position measuring instrument shown in FIG. 9 in its operating position.

To adjust the spacing D, the three levers 90 are actuated by pivoting each one about its rotational axis 91. The direction of actuation is marked F in FIG. 9. In a manner not shown, the three levers may also be actuated in common with a single device. The scanner element 5 is moved by actuation of the levers 90 into a second reference position relative to the mounting element 6. This second reference position, also called the operating position, is shown in FIG. 10. A stop face 6.2 of the mounting element 6 cooperates with a stop face 5.3 of the scanner element 5.

The mounting element 6 of the second preferred embodiment is equivalent to the first embodiment except that the spreader element 11 is a screw 11.10. The screw 11.10 is screwed into the mounting element 6 until the screw head is braced on the mounting element 6. By turning the screw 11.10 further, the thread courses of the screw 11.10 cause a radial spreading of the slit and annular mounting element 6 and thus bring about a radial clamping of the scanning unit 4 in the stator. Once again, the stator 2 may be the housing or the flange of an electric motor.

Instead of the board 5 as the scanner element as shown, according to the invention it is also possible for other inductive scanner elements or other magnetic-field-sensitive, capacitive or photosensitive scanner elements to be mounted. In the case of photoelectric position measuring instruments, the scanner element may also be merely a scanner plate (slit aperture), or a semiconductor substrate with a plurality of photosensitive regions.

The invention can also be used in length measuring instruments.

While the invention has been shown and described in connection with the preferred embodiments, it is apparent that certain changes and modificaitons, in addition to those mentioned above, may be made from the basic features of the present invention. Accordingly, it is the intention of Applicant to protect all variations and modifications within the true spirit and valid scope of the present invention.

What is claimed is:

1. A position measuring instrument for measuring the relative position of two objects movable relative to one another in which a graduation of a scale is scanned by a scanner element of a scanning unit wherein the scale is secured to the first object and the scanning unit is secured to the second object by a mounting element comprising a first stop face and a second stop face, the instrument comprising:
   a positioning element fastened on the mounting element to displace the scanner element relative to the mounting element from a first reference position to a second reference position wherein the first stop face defines the first reference position and the second stop face defines the second reference position.

2. The position measuring instrument according to claim 1 wherein the scale comprises a disk secured to a shaft and rotatable about a rotational axis, the disk comprising a surface at right angles to the rotational axis on which the graduation is provided, wherein the scanner element is in contact with the disk at the first reference position and the scanner element is guided away from the disk to the second reference position by the positioning element.

3. The position measuring instrument according to claim 1 wherein the first stop face of the mounting element cooperates with a first stop face of the positioning element at the first reference position.

4. The position measuring instrument according to claim 3 wherein the positioning element comprises a screw which is axially displaceable in the mounting element.

5. The position measuring instrument according to claim 3 wherein the positioning element comprises a lever which is pivotably supported in the mounting element.

6. The position measuring instrument according to claim 1 wherein the positioning element is axially accessible for actuation.

7. A position measuring instrument for measuring the relative position of two objects movable relative to one another in which a graduation of a scale is scanned by a scanner element of a scanning unit wherein the scale is secured to the first object and the scanning unit is secured to the second object by a mounting element, the instrument comprising:

a positioning element fastened on the mounting element to displace the scanner element relative to the mounting element from a first reference position to a second reference position wherein the first and second reference positions are predetermined by the cooperation of elements integrated in the scanning unit, wherein the scale comprises a disk secured to a shaft and rotatable about a rotational axis, the disk comprising a surface at right angles to the rotational axis on which the graduation is provided, wherein the scanner element is in contact with the disk at the first reference position and the scanner element is guided away from the disk to the second reference position by the positioning element, and wherein the mounting element comprises a clamping element for radial clamping between the mounting element and the second object.

8. The position measuring instrument according to claim 7 wherein the clamping element is oriented parallel to the rotational axis and is accessible and actuatable for clamping in this axial direction.

9. The position measuring instrument according to claim 7 wherein the second object comprises a mounting tube having an inner jacket face to which the mounting element can be clamped.

10. The position measuring instrument according to claim 9 wherein the mounting tube is a component of a motor to the shaft of which the disk is secured in a rotationally rigid manner.

11. A method for mounting a scanning unit of a position measuring instrument, in which a scale is secured to a first object and the scanning unit is secured by means of the following method steps to a second object for scanning the scale, the method comprising the steps of:

a) fixing a scanner element at a first reference position defined by a first stop face of a mounting element by a positioning element;

b) moving the scanning unit, comprising the scanner element, the mounting element and the positioning element in the direction of the scale until the scanner element is in contact with the scale;

c) fixing the mounting element to a second object;

d) moving the scanner element on the mounting element by the positioning element to a second reference position defined by a second stop face of the mounting element to provide a scanning spacing between the scale and the scanner element.

12. A scanning unit of a position measuring device, the scanning unit comprising:

a scanner element;

a mounting element comprising a first stop face and a second stop face; and a positioning element coupling the scanner element to the mounting element, wherein the positioning element moves the scanner element to a first reference position defined by the first stop face of the mounting element in a first state and moves the scanner element to a second reference position defined by the second stop face of the mounting element in a second state.

13. A scanning unit according to claim 12 wherein the positioning element comprises a screw.

14. A scanning unit according to claim 12 wherein the positioning element comprises a lever which is pivotably supported in the mounting element.

15. The position measuring instrument according to claim 2 wherein the mounting element comprises a clamping element for radial clamping between the mounting element and the second object.

16. The position measuring instrument according to claim 15 wherein the clamping element is oriented parallel to the rotational axis and is accessible and actuatable for clamping in this axial direction.

17. The position measuring instrument according to claim 15 wherein the second object comprises a mounting tube having an inner jacket face to which the mounting element can be clamped.

18. The position measuring instrument according to claim 17 wherein the mounting tube is a component of a motor to the shaft of which the disk is secured in a rotationally rigid manner.

* * * * *